March 13, 1951  J. W. JOHNS ET AL  2,545,088

TANK TRAILER

Filed Sept. 17, 1947  2 Sheets-Sheet 1

Inventor
John W. Johns
Carl J. Ekart

By Clarence A. O'Brien
and Harvey B. Jacobson
Attorneys

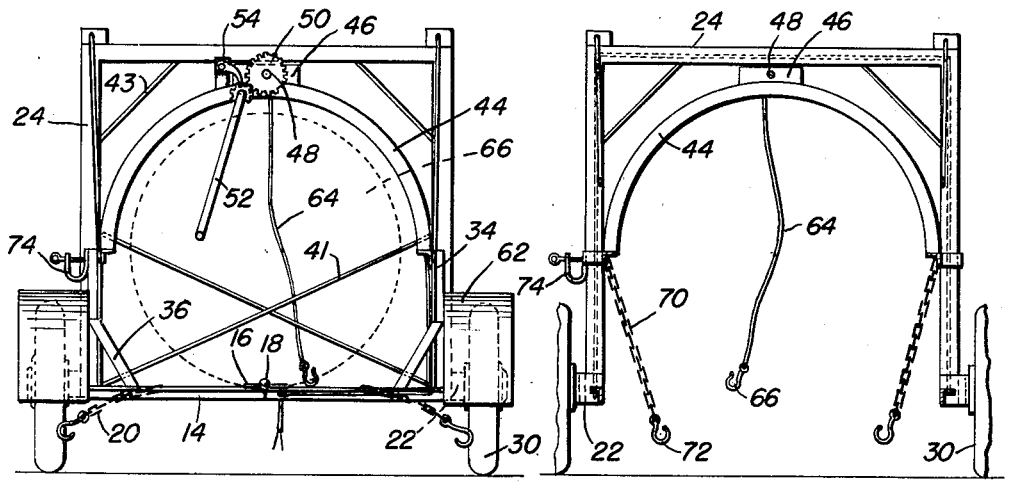
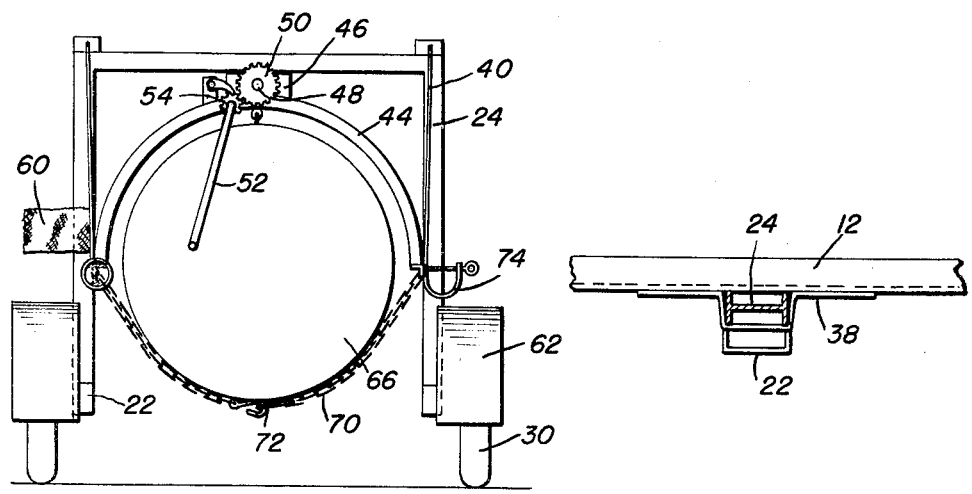

Patented Mar. 13, 1951

2,545,088

UNITED STATES PATENT OFFICE 2,545,088

TANK TRAILER

John W. Johns and Carl J. Ekart, Wamego, Kans.

Application September 17, 1947, Serial No. 774,452

2 Claims. (Cl. 214—75)

This invention relates to new and useful improvements in transportation equipment and more particularly to a trailer for carrying tanks to points for loading or unloading.

The primary object of the present invention is to provide a trailer embodying novel and improved hoisting means whereby a single person may safely raise the tank in position to the trailer for transporting the same or lower the tank from position to the trailer.

Another important object of the present invention is to provide a trailer wherein the tank supporting chains disposed beneath the tank are quickly and readily disengaged so that the hoisting mechanism may be operated to lower the tank upon a ground surface or into a trench dug for the tank.

A further object of the present invention is the provision of a trailer for transporting tanks wherein the bands embracing the tank include brace means for bracing the same against swaying movement as the trailer is being pulled.

A still further aim of the present invention is to provide a tank trailer that is simple and practical in construction, neat and attractive in appearance, efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is a front elevational view of Figure 2 and with dotted lines showing a tank in a raised position to the device;

Figure 5 is a transverse vertical sectional view taken substantially on the plane of section line 5—5 of Figure 1;

Figure 6 is a rear elevational view of Figure 2, and showing the tank in a raised position to the frame; and, Figure 7 is an enlarged longitudinal horizontal sectional view taken substantially on the plane of section line 7—7 of Figure 2.

Figure 1:
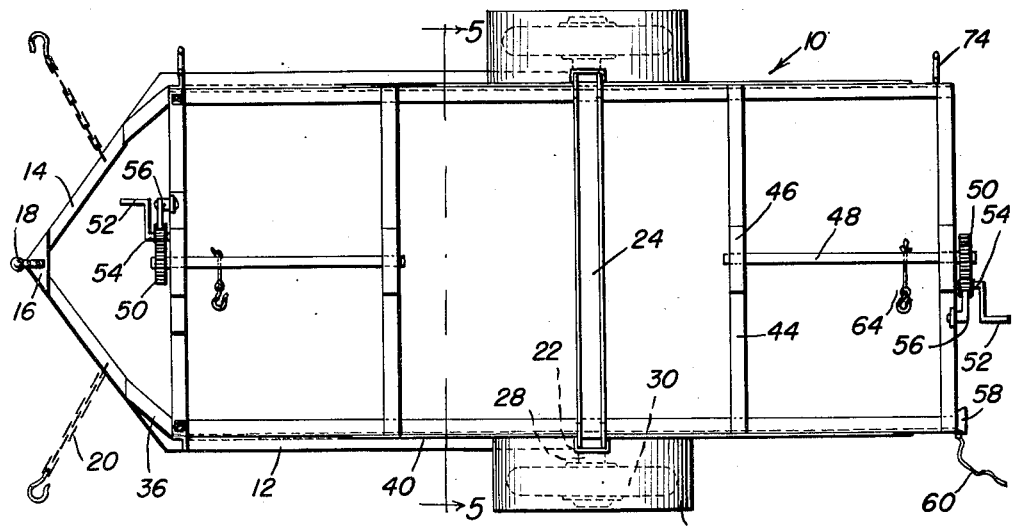
Figure 1 is a top plan view of a trailer constructed in accordance with the present invention.

Referring now to the drawings in detail, wherein for the purpose of illustration, there is disclosed a preferred embodiment of the present invention, the numeral 10 represents the trailer generally that is particularly useful in transporting containers for artificial gas, however, the device is also applicable for hauling underground tanks, oil drums and other such articles.

The lower substantially U-shaped frame 12, of preferably angle iron construction, comprises a pair of spaced parallel side members the forward terminal ends 14 of which converge and are secured to each other by substantially triangular retaining plate 16 supporting an eye member 18. This eye member may be engaged with a suitable vehicle for pulling the trailer forwardly.

Chains 20 are secured at one end to each of the bars 14 for engaging a portion of the vehicle pulling the trailer thereby preventing disengagement of the trailer with the vehicle.

Suitably secured to the rear end of the frame 12 are channel members 22 that are closed at their lower ends. These channel members 22 engage the lower ends of a substantially inverted U-shaped frame 24 of preferably I beam construction. The axis of frame 24 is disposed at right angles to the plane of the lower frame 12.

Figure 3:
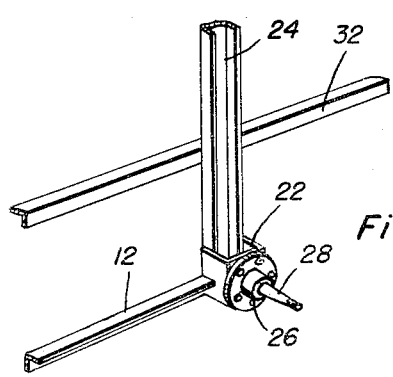
Figure 3 is a fragmentary perspective view of the lower portion of the trailer and showing the manner in which the lower horizontal frame is removably connected to the vertical frame.

Axle plates 26 supporting stub axles 28 are removably secured to the outer faces of members 22, as best shown in Figure 3, and these stub axles receive suitable wheels 30.

The numeral 32 represents an upper substantially rectangular frame which is held spaced above the lower frame 12 by bars 34 secured to the forward ends of the upper frame and the lower frame respectively. Braces 36 secured to the lower frame and to the bars 34 prevent swaying of the upper frame relative to the lower frame. Brackets 38 carried by the side rails of the upper frame loosely engage frame 24 to further prevent swaying of the upper frame relative to the lower frame.

Figure 2:
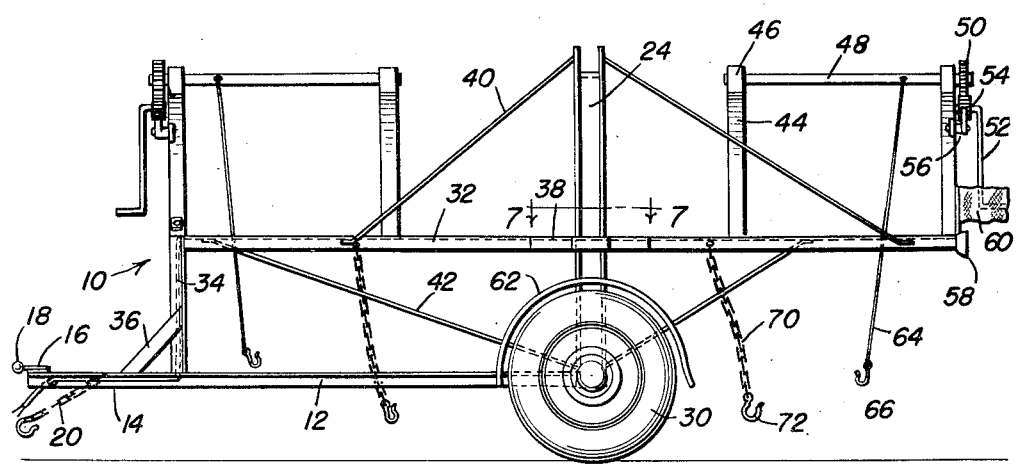
Figure 2 is a side elevational view of Figure 1.

Diagonal guy lines or flexible sway bracing 40 are secured at their ends to the frame 24 and to the upper frame 32 and also retain the upper frame face parallel to the lower frame 12, as thus shown in Figure 2 of the drawings.

Further guy lines or sway bracings 42 are provided between the member 12 and the upper frame 32 to aid in preventing vertical movement or swaying movement of the upper frame relative to the lower frame.

Further cross bracing 41 extend between the free rear end of the lower frame 12 and the frame 24 to prevent outward spreading movement of the free ends of the lower frame. The upper corners of the frame 24 are preferably braced by diagonal braces 43.

The terminal ends of pairs of semi-circular or arcuate bands 44 are fixedly secured to the side rails of frame 32 at both the forward and rear portions of frame 32. To the upper periphery of these bands are secured bearings 46 in which are journaled longitudinal shafts 48 between each pair of bands.

The terminal ends of the forwardly disposed shaft project outwardly from the forward band and one terminal end of the rearwardly disposed shaft projects outwardly from the rear band, to receive gears 50 fixedly mounted on these outwardly projecting ends.

Journaled on the respective front and rear bands are crank handles 52 provided with gears 54 fixed thereto for engaging gears 50.

Pawls 56 pivotally mounted on the forward and rear bands selectively engage the gears 54 to present back rotation of the gears when it is desired to rotate the gears in only one direction.

A suitable bracket 58 is provided at the rear end of the upper frame 32 for engaging the post of a warning flag 60.

Semi-circular fenders 62 carried by the frame 24 loosely embrace the wheels 30 to prevent mud or the like picked up by the wheels from contacting the device.

In practical use of the device, the flexible cables 64 carried by the shaft 48 are placed around tank 66 and then fastened to themselves by hooks or the like 68 carried by the free ends of these cables. By rotating both the handles 52 in one direction the cables 64 will be wound upon the shaft 48 and the tank will be raised in position to the frame.

Obviously, one man may operate the crank handles 52 independently for raising the respective ends of the tank so that the same will be in position to the frame.

Chains 70 secured at one of their ends to the side rails of the upper frame are then engaged by hooks 72 carried by the free ends of the chains so that the tank will not slip downwardly in position to the trailer, as shown in Figure 6 of the drawings.

In order to carry tools, posts or any other articles on the trailer, suitable clamps 74 are secured to the upper frame.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A trailer for hauling and unloading tanks comprising a substantially horizontally disposed wheeled frame, an upper substantially rectangular frame, means connecting and supporting said frames spaced relative to each other, a forward pair of spaced arcuate tank embracing bands fixed at their ends to said upper frame, a rear pair of spaced arcuate tank embracing bands fixed at their ends to said upper frame, longitudinally spaced first and second shafts journaled on the webs of said first pair of bands and said second pair of bands respectively, a forward flexible element fixed at one end to said first shaft and adapted to be wound thereon during the raising of a tank, a rear flexible element fixed at one end to said second shaft and adapted to be wound thereon during the raising of a tank, means for rotating said shafts independently of each other, means for locking the shafts in a selected rotated position, and means carried by the upper frame for supporting a tank in an elevated position.

2. The combination of claim 1, wherein said first mentioned means includes a substantially U-shaped member having its ends secured to said first mentioned frame, and channels carried by said upper frame receiving the legs of said U-shaped member.

JOHN W. JOHNS.
CARL J. EKART.

REFERENCES CITED

The following references are of record in the file of this patent:

UNITED STATES PATENTS

| Number | Name | Date |
|---|---|---|
| 891,364 | Oberly | June 23, 1908 |
| 2,296,611 | Green | Sept. 22, 1942 |
| 2,404,898 | Aycock | July 30, 1946 |
| 2,442,994 | Clary | June 8, 1948 |
| 2,448,119 | Peterson | Aug. 31, 1948 |
| 2,472,557 | Wills | June 7, 1949 |

FOREIGN PATENTS

| Number | Country | Date |
|---|---|---|
| 470,114 | Great Britain | Aug. 10, 1937 |